(12) United States Patent
Yun

(10) Patent No.: US 7,178,625 B2
(45) Date of Patent: Feb. 20, 2007

(54) STEERING ACTUATOR OF INDEPENDENT STEER-BY-WIRE SYSTEM

(75) Inventor: Jung-Rak Yun, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 11/332,572

(22) Filed: Jan. 12, 2006

(65) Prior Publication Data

US 2006/0113142 A1    Jun. 1, 2006

Related U.S. Application Data

(62) Division of application No. 10/749,228, filed on Dec. 30, 2003, now Pat. No. 6,991,573.

(30) Foreign Application Priority Data

May 30, 2003 (KR) ............... 2003-34719
May 30, 2003 (KR) ............... 2003-34720

(51) Int. Cl.
*B62D 5/00* (2006.01)
*B62D 5/04* (2006.01)

(52) U.S. Cl. ............. 180/444; 180/402; 180/445

(58) Field of Classification Search ......... 180/402, 180/444, 445
See application file for complete search history.

(56) References Cited

FOREIGN PATENT DOCUMENTS

| CN | 2105591 U | 5/1992 |
|---|---|---|
| EP | 1110845 A1 | 6/2001 |
| JP | 10-147248 A | 6/1998 |

*Primary Examiner*—Lesley D. Morris
*Assistant Examiner*—Marc A. Scharich
(74) *Attorney, Agent, or Firm*—Morgan Lewis & Bockius LLP

(57) ABSTRACT

A steering actor of an independent type steer-by-wire system comprises a housing fixed to a vehicle body and an ultrasonic motor. The ultrasonic motor has a stator internally fixed to the housing and a rotator rotating relative to the stator when an electric current is applied. A steering rod having a first end and a second end penetrates through a center portion of the ultrasonic motor. The first end of the steering rod extends out of the housing for connection to a tie rod. A movement conversion means is operably associated with the steering rod for converting rotating movement of the ultrasonic motor into linear movement of the steering rod.

1 Claim, 4 Drawing Sheets

STEERING ACTUATOR OF INDEPENDENT STEER-BY-WIRE SYSTEM

CROSS-REFERENCE TO RELATED APPLICATIONS

This is a divisional application of U.S. application Ser. No. 10/749,228, filed Dec. 30, 2003 now U.S. Pat. No. 6,991,573, which claims priority to Korean Application Nos. 10-2003-0034719 and 10-2003-0034720, both filed on May 30, 2003, the disclosures of all of which are incorporated fully herein by reference.

FIELD OF THE INVENTION

The present invention relates to a steer-by-wire system, and more particularly, to a steering actuator for embodying an independent steer-by-wire system.

BACKGROUND OF THE INVENTION

Vehicular power steering systems have developed from hydraulic systems to electro-hydraulic systems, and more recently, to the electric power steering systems currently in wide use. In the near future, steer-by-wire systems employing a highly advanced electronic control system may be put to practical use.

Electronically controlled steer-by-wire systems may be configured in such a way so as to eliminate the steering column from existing electric power steering systems. In addition, a torque sensor and a steering angle sensor may be interconnected with a steering wheel so as to detect the steering intention of a driver. Accordingly, the torque sensor and angle sensor may be further configured to operate a separately installed actuator, such as a motor, thereby generating a steering force.

Because steer-by-wire systems as described above may no longer employ a steering column to achieve direct transmission of a steering force, it may no longer be necessary to mechanically connect steering units provided at both wheels of the vehicle by means, for example, a link.

Due to the development of independent steer-by-wire systems wherein both steering units are provided at both vehicle's wheels and separated from each other, it may be possible to increase the available space within an engine compartment. In order to achieve independent steer-by-wire systems, it is desirable to provide a steering actuator adapted to individually apply a steering force to the separate steering units provided at both vehicle's wheels. Preferably, the steering actuator further is small in size and light weight. In addition, the steering actuator should be capable of operation without a force transmitted from the vehicle's wheels. Moreover, the steering actuator must have accurate control for safety and the like.

SUMMARY OF THE INVENTION

Embodiments of the present invention provide a steering actuator satisfying the above requirements for embodying an independent steer-by-wire system.

In accordance with a preferred embodiment of the present invention, a steering actuator of an independent type steer-by-wire system comprises a housing fixed to a vehicle body and an ultrasonic motor. The ultrasonic motor preferably has a stator internally fixed to the housing and a rotator rotating relative to the stator when electric current is applied. A steering rod penetrates through a center portion of the ultrasonic motor. One end of the steering rod extends out of the housing and is connected to a tie rod. A movement conversion means is provided for converting rotating movement of the ultrasonic motor into linear movement of the steering rod.

Preferably, the movement conversion means may include a ring gear internally fixed to the housing, planetary gears installed to the rotator of the ultrasonic motor by means of pins. Each of the planetary gears may be engaged with an inner peripheral suds of the ring gear. A sun gear having an outer peripheral surface may be provided with the outer peripheral surface engaged with the planetary gears. The sun gear being may include worm gears formed at an inner peripheral surface of the sun gear. Racks may be formed at the steering rod and are engaged with the worm gears of the sun gear.

Preferably, the movement conversion means may include a rotator ring gear integrally and internally formed at the rotator of the ultrasonic motor. A plurality of pinions may be engaged with the rotator ring gear, the rotating shafts of the plurality of pinions preferably being fixed to the housing. Worm gears may be integrally connected to the pinions, respectively, and a plurality of racks may be formed at the steering rod so as to be engaged with the worm gears, respectively. Additionally the plurality of pinions and worm gears may be preferably circumferentially spaced inside the rotator.

BRIEF DESCRIPTION OF THE DRAWINGS

For fuller understanding of the nature and objects of the invention, reference should be made to the following detailed description taken in conjunction with the accompanying drawings in which.

DESCRIPTION OF THE PREFERRED EMBODIMENTS

Figure 1:
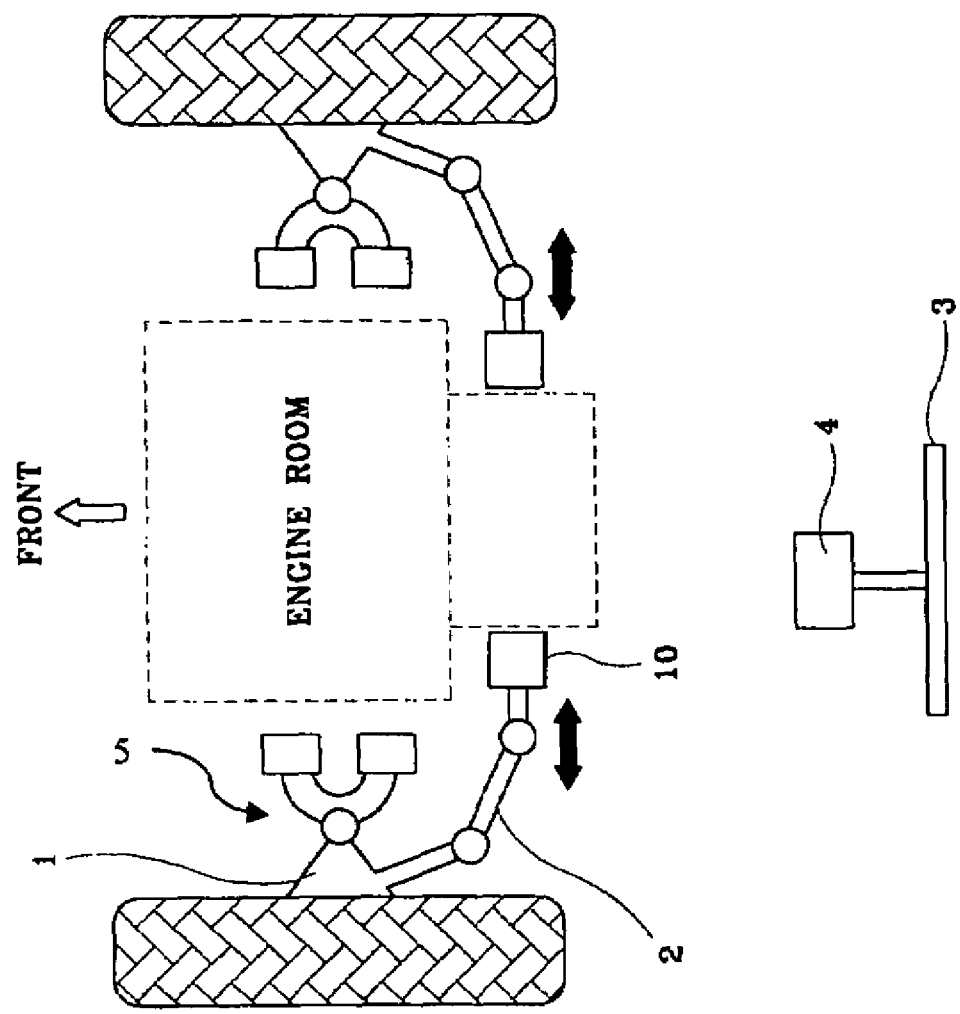
FIG. 1 is a schematic plan view of an independent steer-by-wire system in accordance with the present invention.

Shown in FIG. 1 is a preferred embodiment of an independent steer-by-wire system, in which steering units 5 provided at both vehicle's wheels are independently installed without being interconnected. Each steering unit 5 preferably comprises a knuckle 1 connected with the vehicle's wheels, and a tie rod 2 for operating the knuckle 1.

Unlike conventional steering systems, the independent structure of both steering units in the present invention may eliminate the need for a conventional rack bar and other links which may cross an engine compartment thereby increasing the available space within the engine compartment. In FIG. 1, reference numerals 3 and 4 denote a steering wheel and a steering control signal generating unit, respectively. The steering control signal generating unit may consist of various sensors, for example, a torque sensor and/or a steering angle sensor.

In order to apply a steering force to both independent steering units 5, a steering actuator 10 may be provided for the input of the steering force through each tie rod 2. The steering actuator 10, in accordance with one embodiment of the present invention, may comprise a housing 11 fixed to a vehicle body and an ultrasonic motor 13. The ultrasonic motor 13 may include a stator 13a preferably internally fixed to the housing 11 and a rotator 13b, rotatable relative to the stator 13a upon application of an electric current. The steering actuator 10 may further include a steering rod 17 preferably positioned so as to penetrate through the center portion of the ultrasonic motor 13. One end of the steering rod may extend out of the housing 11 so as to be connected to the tie rods 2. The steering actuator may also include a movement conversion means for converting rotating movement of the ultrasonic motor 13 into linear movement of the steering rod 17.

Figure 2:
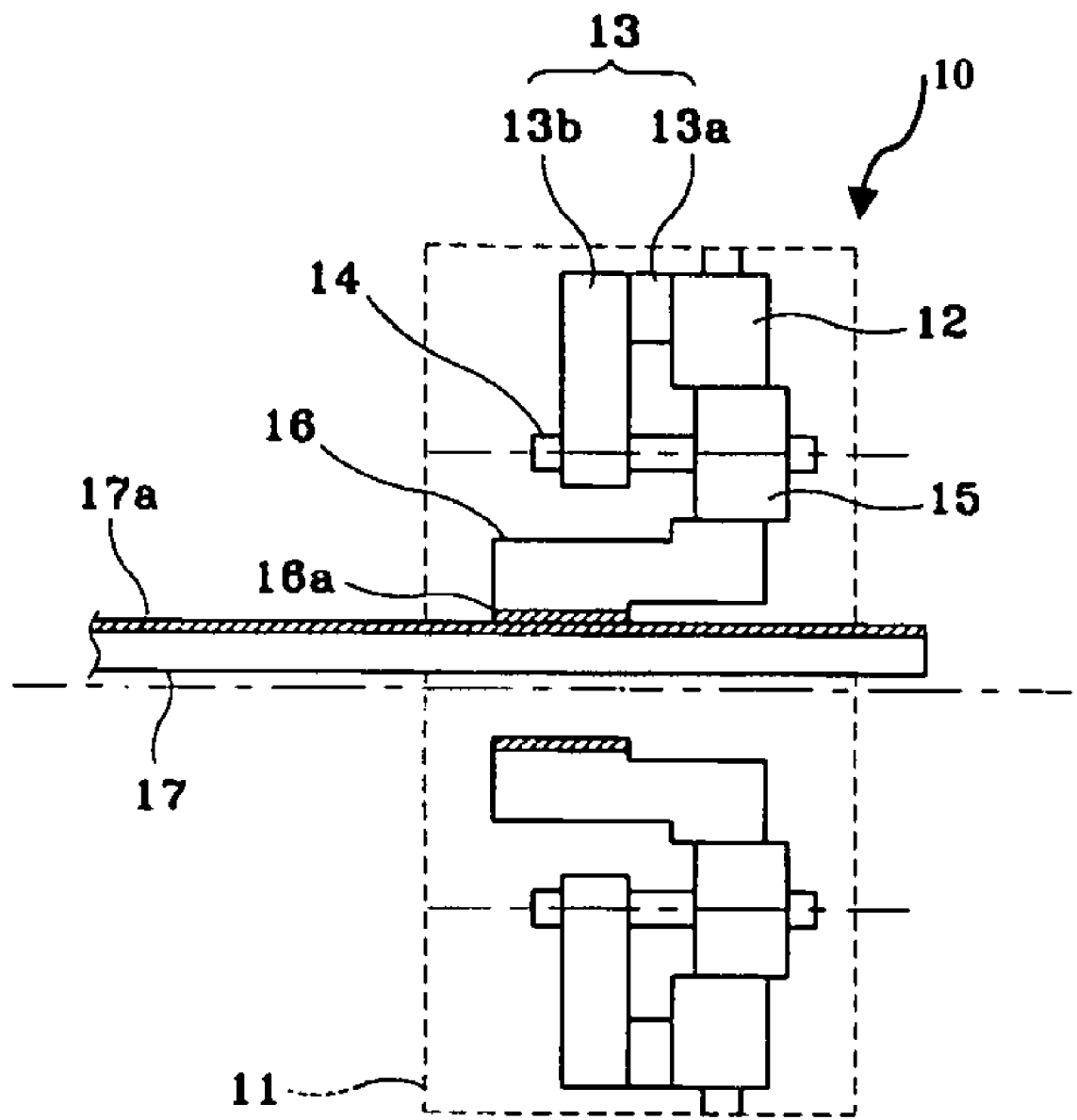
FIG. 2 is a sectional view of a steering actuator in accordance with a first embodiment of the present invention.
Figure 3:
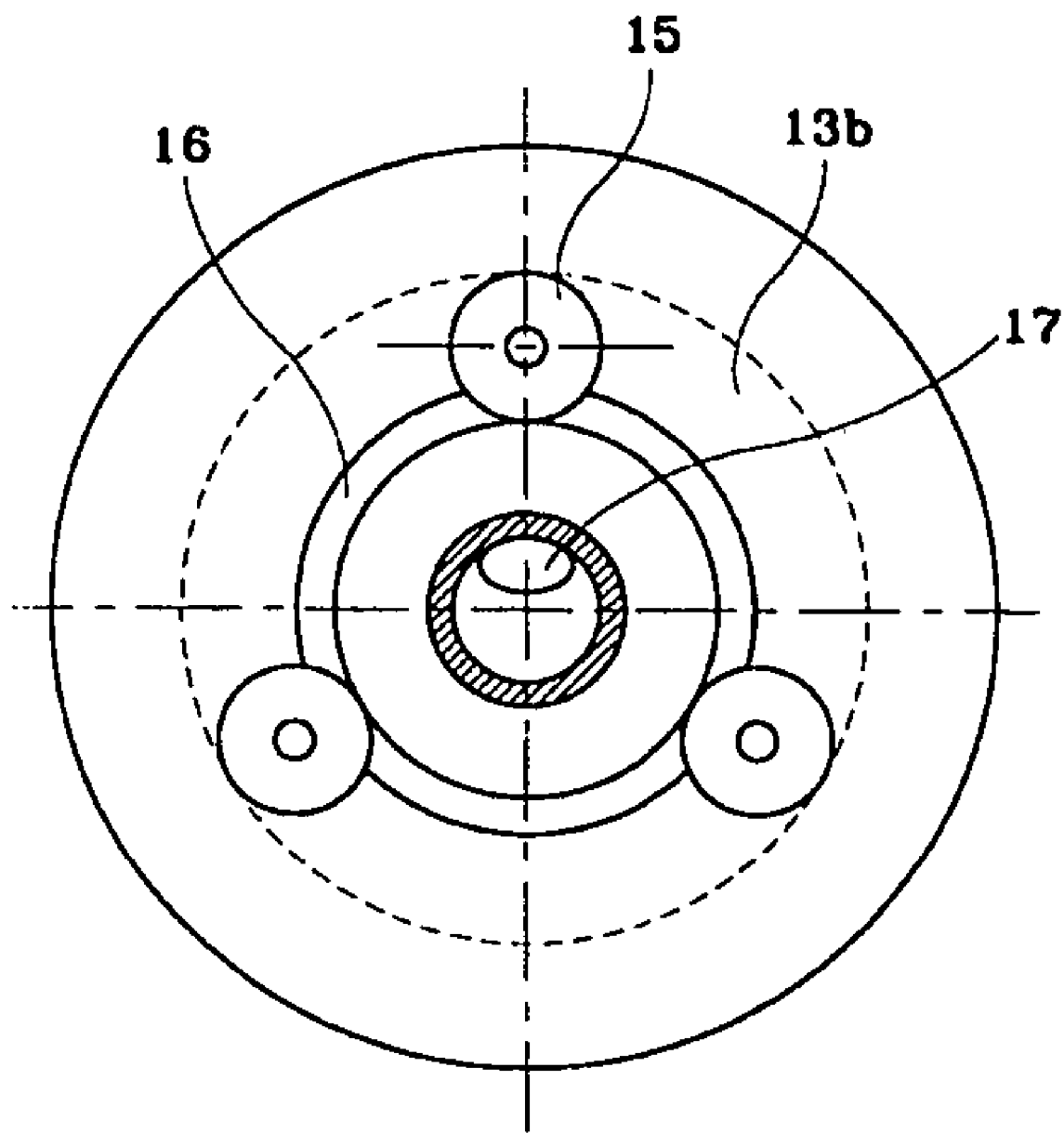
FIG. 3 is a right-side sectional view of the steering actuator of FIG. 2.

As shown in FIGS. 2 and 3, the steering actuator 10 may be preferably constructed so that rotating movement of the ultrasonic motor 13 installed inside the housing 11 is transmitted to the steering rod 17 by means of a planetary gear device.

The housing 11 may be mounted at an appropriate position of the vehicle body (or frame) preferably close to one of the tie rods 2 so as to be easily connected to the associated tie rod 2 of one independent steering unit.

The housing 11 may be coupled, integrally or otherwise, at the inner peripheral surface thereof with a ring gear 12 and the stator 13a, as one constitutive component of the ultrasonic motor 13, so as to hinder rotation.

The rotator 13b, preferably located at the side of the stator 13a, acts as the other constitutive component of the ultrasonic motor 13, and in turn, the rotator 13b may be rotatably connected with planetary gears 15 by means of pins 14.

The planetary gears 15 may be engaged with gear teeth formed at the inner peripheral surface of the ring gear 12. In addition, planetary gears 15 may be simultaneously engaged with gear teeth formed at the outer peripheral surface of a sun gear 16 which may be internally located relative to the planetary gears 15.

The sun gear 16 may be formed with worm gears 16a at the inner peripheral surface of the sun gear 16. The worm gears 16a may be engaged with racks 17a formed at the upper surface of the steering rod 17, preferably internally located relative to the sun gear 16.

Both ends of the steering rod 17 may extend out of the housing 11 in order to be rotatably connected to the associated tie rod 2 as an input end of the steering unit.

In the present embodiment, the ring gear 12, planetary gears 15, sun gear 16 and/or racks 17a formed at the steering rod 17 may constitute the movement conversion means for converting rotating movement of the ultrasonic motor 13 into translational movement, for example, linear movement of the steering rod 17.

The operation of the present embodiment will now be explained.

Sensor signals outputted from the above described steering control signal generating unit 4 may be inputted into a separate control unit subject to signal processing for use in control of the electric current to be supplied to the ultrasonic motor 13.

An ultrasonic motor (USM) is a well known device. A USM may comprise a stator and a rotator, which may be attached to each other in a squeezed state obtained by a piezoelectric ceramic. When electric signals are applied to the piezoelectric ceramic, the stator oscillates along an elliptical trace (according to an ultrasonic oscillation frequency of, for example, more than 20 kHz), and such oscillation effects to push the rotator which is squeezed to the stator. The rotator may therefore be driven according to the above principle. The rotating direction of the ultrasonic motor may be freely changed in a desired manner by the electric signals applied to the piezoelectric ceramic. Consequently, the ultrasonic motor can may be utilized as a steering actuator.

Referring again to the present invention, the rotator 13b of the ultrasonic motor 13 rotates when controlled electric current is applied to the stator 13a. Due to the rotation of the rotator 13b, the planetary gears 15 are rotated and revolved along the inner peripheral surface of the fixed ring gear 12, thereby causing the sun gear 16 engaged with the planetary gears 15 to rotate. That is, the rotator 13b may serve as a carrier for a general planetary gear assembly, the operation of the rotator 13b being the same as that of the general planetary gear assembly.

By virtue of the interaction between the worm gears 16a formed at the inner peripheral surface of the sun gear 16 and the racks 17a formed at the upper surface of the steering rod 17, the steering rod 17 moves forward and backward according to the rotating direction of the sun gear 16 when the sun gear 16 rotates as stated above. The forward and backward motion of the steering rod 17 allows the tie rod 2, which is preferably connected to the associated end of the steering rod 17, to be pushed or pulled so as to control the traveling direction of a vehicle's wheel.

The ultrasonic motor 13 has various advantageous features as follows. First, in comparison with a general motor having a high speed and low torque feature, the ultrasonic motor has an opposite low speed and high torque feature, and does not necessarily require a separate speed reduction mechanism since it may operate at a low speed of 10 to 100 rpm by itself. Second, the ultrasonic motor may be configured with a self-fixing ability. The rotator of the ultrasonic motor maintains a firmly fixed state so long as electric signals are not applied to the ultrasonic motor, thereby endowing the ultrasonic motor with a brake function and eliminating the need for a separate brake. Third, the ultrasonic motor may have a high-reactivity feature due to its small inertia and large brake power, in addition to a high adjustability feature due an extremely short time delay, for example, not exceeding $1/1000$ second. The high-reactivity and adjustability features may enable highly accurate position and speed control. Fourth, the ultrasonic motor does not generate a magnetic field and is not affected by magnetic fields since it does not use any magnetic elements. Finally, the ultrasonic motor may be preferably small in size and light weight, generating a negligible amount, if any, noise. Since it has no coils, the ultrasonic motor is simplified in structure, and therefore, is light in weight, enables miniaturization, so as to reduce overall driving noise. In summary, the ultrasonic motor may meet various preferred characteristics of a steering actuator for an independent steer-by-wire system, for example, the ultrasonic motor may be small in size and light in weight, it is not operated by a force transmitted from the vehicle's wheels, and it enables accurate control.

Figure 4:
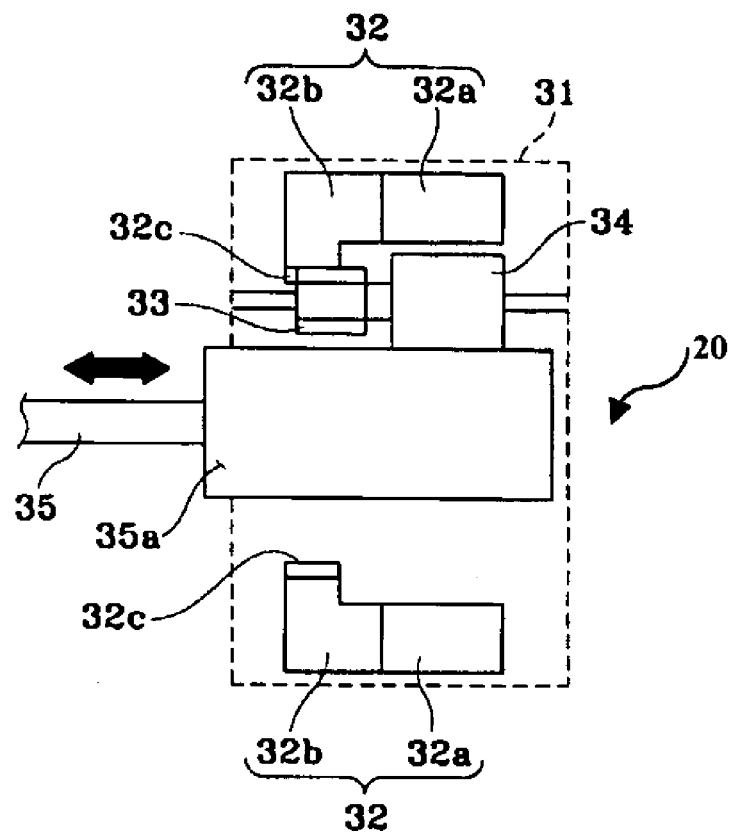
FIG. 4 is a sectional view of a steering actuator in accordance with a second embodiment of the present invention.
Figure 5:
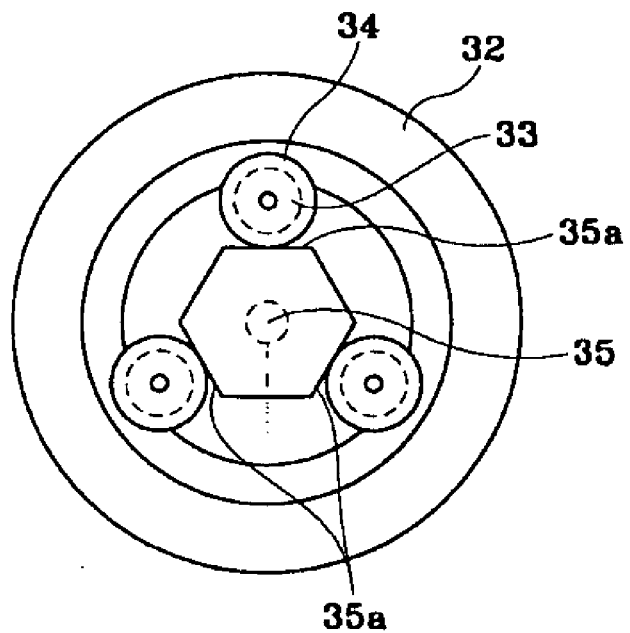
FIG. 5 is a right-side sectional view of the steering actuator of FIG. 4.

Shown in FIGS. 4 and 5, is an alternative steering actuator 20 in accordance with the present invention. Steering actuator 20 may comprise a housing 31 preferably fixed to the vehicle body and an ultrasonic motor 32 having a stator 32a and a rotator 32b. The stator 32a may be preferably internally fixed to the housing 31 and the rotator 32b may be configured to rotate relative to the stator 32a when electric current is applied thereto. The steering actuator 20 may further comprise a plurality of pinions 33, worm gears 34 connected, integrally or otherwise, to the pinions 33, and a steering rod 35 having a plurality of racks 35a preferably engaged with the worm gears 34. The pinions 33 may engage a rotator ring gear 32c, which is preferably integrally formed at the rotator 32b in a rotatable manner. The rotating shafts of pinions 33 may be fixed to the housing 31. The steering rod 35 is preferably connected to the tie rod 2 at its one end which extends out of the housing 31.

In the present embodiment, the rotor ring gear 32c, the plurality of pinions 33, worm gears 34 and the plurality of racks 35a formed at the steering rod 35 may comprise the movement conversion means, for converting rotating movement of the ultrasonic motor 32 into linear movement of the steering rod 35.

The pinions 33 and worm gears 34 are limited in their axial movements along their rotating shafts, and are adapted to support both thrust and radial loads acting thereto by use of taper bearings and the like in the same manner as known techniques in the art.

Preferably, at least three pinions 33 and three worm gears 34 are circumferentially equidistantly spaced about steering rod 35 inside the rotator 32b, as shown in FIG. 5.

In the present embodiment, three pinions 33 and three worm gears 34 are equally installed by spacing angles of 120° along the circumferential direction inside the rotator 32b. Steering rod 35 preferably has a hexagonal sectional shape at least at a portion formed with the racks 35a. Racks 35a, preferably engaged with the worm gears 34, may be formed at three surfaces of the hexagonal sectional shape so as to be accordingly arranged by spacing angles of 120°. Therefore, steering rod 35 may be surrounded and restricted by the three worm gears 34.

The steering actuator of the present embodiment may be actuated by electric current supplied to the ultrasonic motor 32 according to sensor signals outputted from the steering control signal generating unit 4 in the same manner as the previous embodiment Accordingly, the rotator 32b of the ultrasonic motor 32 rotates when controlled electric current is applied to the stator 32a. The rotating force of the rotator 32b may be used to rotate the worm gears 34 after passing through the rotator ring gear 32c and pinions 33. In turn, the rotating force of the worm gears 34 may allow the racks 35a of the steering rod 35 to linearly move thereby operating the tie rod 2 by the interconnection between the steering rod 35 and the tie rod 2.

The present embodiment of the steering actuator system differs from the first embodiment in that the pinions 33 and worm gears 34 rotate relative to the housing 31 without revolution, thereby allowing the steering rod 35 only to linearly move. As a result the present embodiment can embody an independent type steer-by-wire system with a more simplified construction.

As apparent from the above description, the present invention provides a steering actuator of an independent type steer-by-wire system, which is not operated by a force transmitted from a vehicle's wheels, enables accurate control, and particularly achieves a compact construction by virtue of a steering rod for driving a tie rod associated thereto, the steering rod being installed at the same or adjacent position as a rotating shaft provided in an ultrasonic motor serving as a driving source thereof, thereby securing an increase in available space within an engine compartment.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A steering actuator of an independent type steer-by-wire system comprising:
    a housing fixed to a vehicle body;
    an ultrasonic motor having a stator internally fixed to said housing and a rotator rotating relative to said stator when an electric current is applied;
    a steering rod having a first end and a second end, the steering rod penetrating through a center portion of said ultrasonic motor, the first end of said steering rod extending out of said housing for connection to a tie rod; and
    a movement conversion means operably associated with said steering rod for converting rotating movement of said ultrasonic motor into linear movement of said steering rod;
    wherein said movement conversion means includes:
        a ring gear having an inner peripheral surface, the ring gear being internally fixed to said housing;
        at least one planetary gear installed to said rotator of said ultrasonic motor by means of pins, said at least one planetary gear being engaged with the inner peripheral surface of said ring gear;
        a sun gear having an outer peripheral surface and an inner peripheral surface, the outer peripheral of the sun gear being engaged with said at least one planetary gear;
        at least one worm gear formed with the inner peripheral surface of said sun gear; and
        at least one rack formed at said steering rod, said at least one rack being engaged with said at least one worm gear.

* * * * *